United States Patent
Oshita et al.

(10) Patent No.: US 12,202,477 B2
(45) Date of Patent: Jan. 21, 2025

(54) DRIVING ASSISTANCE DEVICE AND DRIVING ASSISTANCE METHOD

(71) Applicant: Isuzu Motors Limited, Tokyo (JP)

(72) Inventors: Wasantha Oshita, Fujisawa (JP); Masaichi Takahashi, Fujisawa (JP); Shinichiro Fukazawa, Fujisawa (JP)

(73) Assignee: Isuzu Motors Limited, Yokohama (JP)

( * ) Notice: Subject to any disclaimer, the term of this patent is extended or adjusted under 35 U.S.C. 154(b) by 241 days.

(21) Appl. No.: 17/801,251

(22) PCT Filed: Feb. 26, 2021

(86) PCT No.: PCT/JP2021/007274
§ 371 (c)(1),
(2) Date: Aug. 21, 2022

(87) PCT Pub. No.: WO2021/172494
PCT Pub. Date: Sep. 2, 2021

(65) Prior Publication Data
US 2022/0410887 A1    Dec. 29, 2022

(30) Foreign Application Priority Data
Feb. 28, 2020    (JP) ................. 2020-034393

(51) Int. Cl.
*B60W 30/14*    (2006.01)

(52) U.S. Cl.
CPC ......... *B60W 30/14* (2013.01); *B60W 2520/04* (2013.01); *B60W 2540/10* (2013.01); *B60W 2540/12* (2013.01); *B60W 2540/215* (2020.02); *B60W 2710/021* (2013.01); *B60W 2710/10* (2013.01)

(58) Field of Classification Search
CPC ............ B60W 30/14; B60W 2520/04; B60W 2540/10; B60W 2540/12; B60W 2540/215; B60W 2710/021; B60W 2710/10; B60W 2050/146; B60W 30/17; B60W 50/14
See application file for complete search history.

(56) References Cited

U.S. PATENT DOCUMENTS

| | | | | |
|---|---|---|---|---|
| 4,831,533 | A * | 5/1989 | Skoldheden | F02D 11/105 123/352 |
| 6,078,860 | A * | 6/2000 | Kerns | F02D 11/106 123/399 |
| 7,706,953 | B1 * | 4/2010 | Sun | B60T 7/042 340/441 |

(Continued)

FOREIGN PATENT DOCUMENTS

| | | |
|---|---|---|
| JP | 07-017295 | 1/1995 |
| JP | 2011-207426 | 10/2011 |

(Continued)

*Primary Examiner* — Mussa A Shaawat

(57) ABSTRACT

This driving assistance device comprises: an ACC starting operation reception unit that receives an ACC starting operation by a driver of a vehicle when the vehicle is stationary; and an ACC starting operation retention unit that retains the ACC starting operation received by the ACC starting operation reception unit as a valid instruction for a predetermined period after the ACC starting operation, and that cancels the ACC starting operation after a lapse of the predetermined period.

6 Claims, 4 Drawing Sheets

(56) References Cited

U.S. PATENT DOCUMENTS

| | | | | |
|---|---|---|---|---|
| 2003/0234127 | A1* | 12/2003 | Sudou | B60W 30/16 |
| | | | | 180/170 |
| 2011/0246043 | A1* | 10/2011 | Maruyama | G08G 1/166 |
| | | | | 701/96 |
| 2017/0297453 | A1* | 10/2017 | Hashimoto | B60L 3/0076 |
| 2018/0141551 | A1* | 5/2018 | Sugano | B60W 30/17 |
| 2018/0222480 | A1* | 8/2018 | Shokonji | B60W 30/17 |
| 2019/0184992 | A1* | 6/2019 | Kanno | B60W 50/10 |
| 2019/0375407 | A1* | 12/2019 | Maleki | B60W 30/14 |
| 2019/0378036 | A1* | 12/2019 | Tuzi | G06N 20/00 |
| 2021/0114584 | A1* | 4/2021 | Hiratsuka | B60W 40/08 |

FOREIGN PATENT DOCUMENTS

| | | |
|---|---|---|
| JP | 2013-123993 | 6/2013 |
| JP | 2018-127078 | 8/2018 |
| WO | WO 2017/009940 | 1/2017 |

\* cited by examiner

DRIVING ASSISTANCE DEVICE AND DRIVING ASSISTANCE METHOD

TECHNICAL FIELD

The present disclosure relates to a driving assistance apparatus that assists the driving of a vehicle and a driving assistance method of assisting the driving of the vehicle.

BACKGROUND ART

In recent years, as one technology of assisting the driving of a vehicle, adaptive cruise control (hereinafter referred to as "ACC") has been gathering attention (for example, see Patent Literature (hereinafter, referred to as PTL 1)). The ACC is a technology of obtaining the vehicle speed of a vehicle, the relative speed of a leading vehicle with respect to the vehicle, the inter-vehicle distance between the vehicle and the leading vehicle, and the like, and controlling a driving system and a braking system of the vehicle such that the vehicle speed and the inter-vehicle distance from the leading vehicle are maintained to be constant.

CITATION LIST

Patent Literature

PTL 1
Japanese Patent Application Laid-Open No. HEI 7-17295

SUMMARY OF INVENTION

Technical Problem

In a vehicle in which an ACC function is installed, an ACC departure operation section for performing a departure operation while the ACC is active is provided in addition to an ACC ON/OFF operation section for performing an ON/OFF operation of the ACC. The ACC ON/OFF operation section is a switch and a lever provided in the vicinity of a steering, for example. The ACC departure operation section is a lever and an accelerator pedal provided in the vicinity of the steering, for example.

The ACC departure operation section is provided because automatic departure by the ACC is prohibited due to regulations. In other words, the departure from a state in which the vehicle is being stopped while the ACC is ON is only performed when a driver operates the ACC departure operation section.

Some vehicles do not accept the ACC departure operation when a distance from a leading vehicle is smaller than certain determined departure-permission inter-vehicle distance D1 even when the ACC departure operation is performed by the driver while the vehicle is being stopped. This is conceived to be performed because own car may not be able to stop when a leading car suddenly stops when the inter-vehicle distance is smaller than departure-permission inter-vehicle distance D1, and such a situation is to be prevented.

However, inter-vehicle distance D2 when the vehicle is stopped by the ACC is generally smaller than departure-permission inter-vehicle distance D1. Therefore, the driver needs to perform the ACC departure operation after waiting for the inter-vehicle distance from the leading car to become departure-permission inter-vehicle distance D1 while the vehicle is being stopped, which is mentally tiring. When the ACC departure operation is performed when the inter-vehicle distance from the leading car is smaller than departure-permission inter-vehicle distance D1, the operation is not accepted. Therefore, the ACC departure operation needs to be performed again when the inter-vehicle distance becomes equal to or more than departure-permission inter-vehicle distance D1, thereby taking time and effort.

The present disclosure has been made in view of the abovementioned points and provides a driving assistance apparatus and a driving assistance method capable of simplifying an ACC departure operation by a driver at the time of departure while avoiding a case where the ACC departure is performed at a timing unintended by the driver.

Solution to Problem

One aspect of a driving assistance apparatus of the present disclosure is an apparatus that assists driving of a vehicle, the driving assistance apparatus comprising:
  an ACC-departure-operation accepting section that accepts a departure operation by a driver when adaptive cruise control (ACC) is ON and while own car is being stopped; and
  an ACC-departure-operation holding section that holds the ACC departure operation accepted by the ACC-departure-operation accepting section as an effective instruction for a predetermined period of time from when the ACC departure operation is provided and cancels the ACC departure operation after an elapse of the predetermined period of time.

One aspect of a driving assistance method of the present disclosure is a method of assisting driving of a vehicle, the driving assistance method comprising:
  an ACC-departure-operation accepting step of accepting an ACC departure operation by a driver while own car is being stopped; and
  an ACC-departure-operation holding step of holding the accepted ACC departure operation as an effective instruction for a predetermined period of time from when the ACC departure operation is provided and canceling the ACC departure operation after an elapse of the predetermined period of time.

Advantageous Effects of Invention

According to the present disclosure, by holding the ACC departure operation accepted by the ACC-departure-operation accepting section as an effective instruction for a predetermined period of time from when the ACC departure operation is provided and canceling the ACC departure operation after an elapse of the predetermined period of time, the ACC departure operation by the driver at the time of departure can be simplified while avoiding a case where the ACC departure is performed at a timing unintended by the driver.

DESCRIPTION OF EMBODIMENTS

One embodiment of the present invention is described in detail below with reference to the accompanying drawings.

<1> Configuration of Vehicle

First, the configuration of a vehicle including a driving assistance apparatus according to one embodiment of the present disclosure is described.

Figure 1:
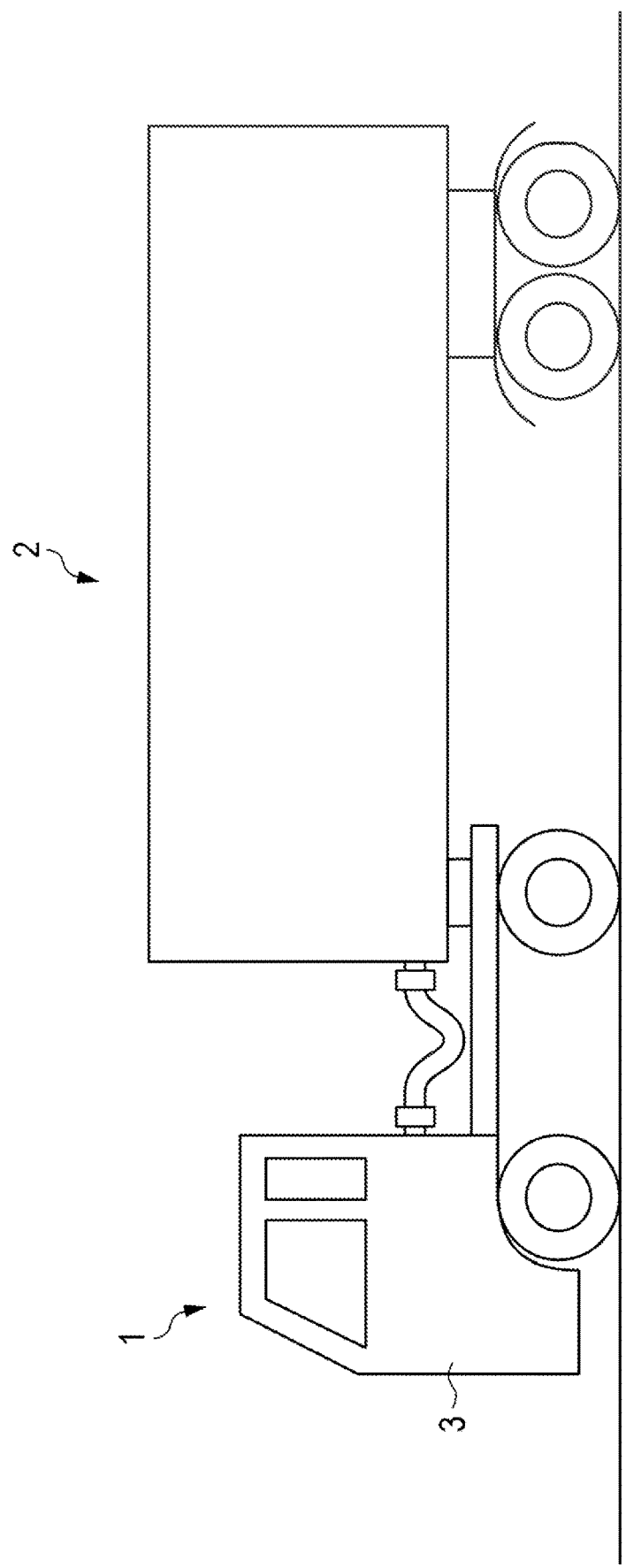
FIG. 1 is an external view illustrating an example of a vehicle to which a driving assistance apparatus according to an embodiment is applied.
Figure 2:
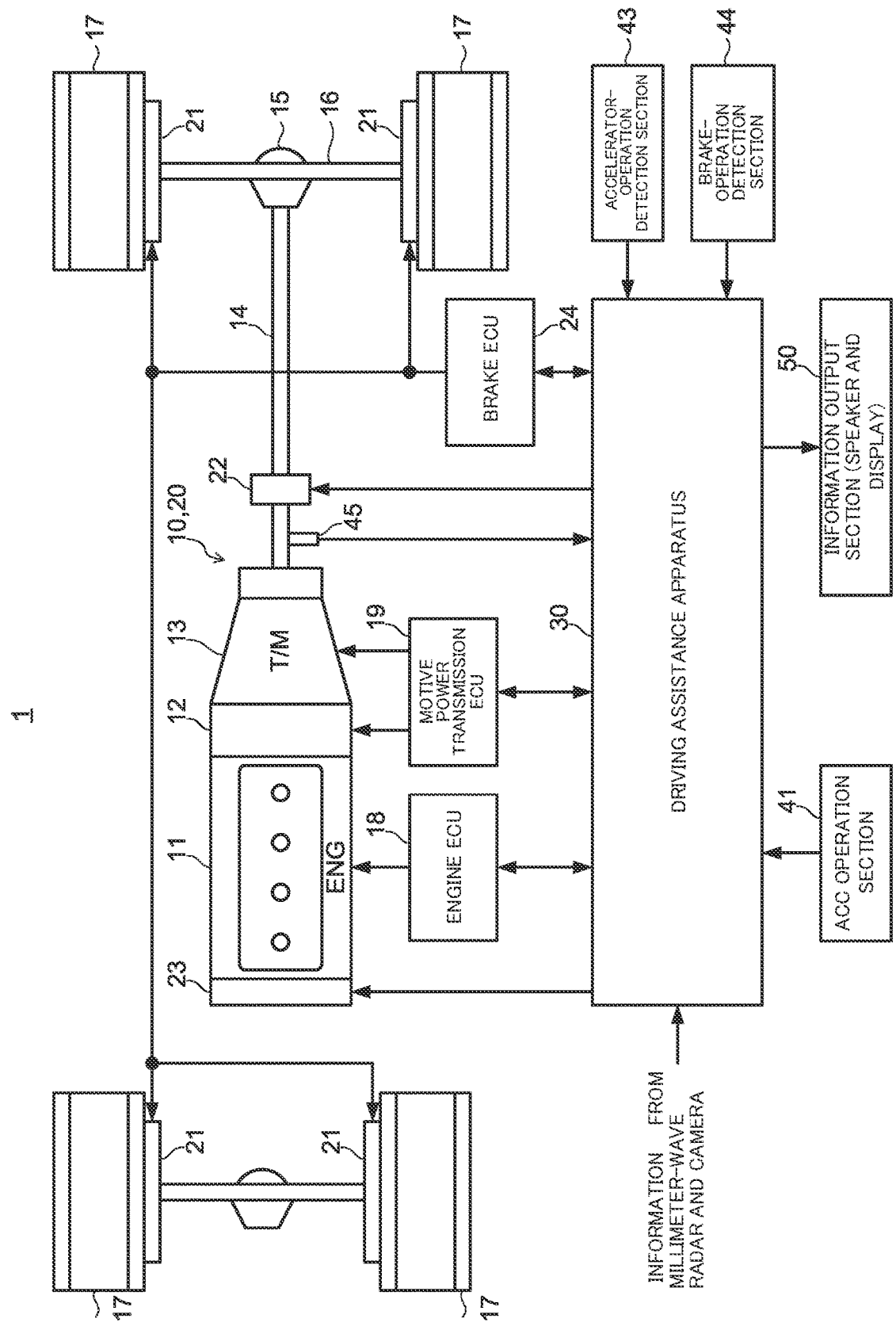
FIG. 2 is a block diagram illustrating the configuration of the vehicle of the embodiment.

FIG. 1 is an external view illustrating an example of vehicle 1 to which a driving assistance apparatus according to the present embodiment is applied. FIG. 2 is a block diagram illustrating the configuration of vehicle 1. Illustration and description are made by focusing on parts relating to the driving assistance apparatus.

As illustrated in FIG. 1, vehicle 1 is a tractor (traction vehicle) capable of towing trailer 2 as a result of coupling trailer 2 to the tractor. Vehicle 1 has vehicle main-body portion 3 including a power system such as an engine and driving wheels and a driver's seat, and trailer 2 coupled to vehicle main-body portion 3.

As illustrated in FIG. 2, vehicle 1 has driving system 10 that causes vehicle 1 to travel, braking system 20 that decelerates vehicle 1, driving assistance apparatus 30 that assists the driving of vehicle 1 by a driver, and the like.

Driving system 10 has engine 11, clutch 12, transmission 13, propeller shaft 14, differential gear 15, drive shaft 16, wheels 17, engine ECU 18, and motive power transmission ECU 19.

Engine ECU 18 and motive power transmission ECU 19 are connected to driving assistance apparatus 30 by an in-vehicle network such as a controller area network (CAN) and are able to transmit and receive necessary data and control signals to and from each other. Engine ECU 18 controls the output of engine 11 in accordance with a drive command from driving assistance apparatus 30. Motive power transmission ECU 19 controls the connection and disconnection of clutch 12 and the speed change of transmission 13 in accordance with a drive command from driving assistance apparatus 30.

The motive power of engine 11 is transmitted to transmission 13 via clutch 12. The motive power transmitted to transmission 13 is further transmitted to wheels 17 via propeller shaft 14, differential gear 15, and drive shaft 16. As a result, the motive power of engine 11 is transmitted to wheels 17, and vehicle 1 travels.

Braking system 20 has service brakes 21, auxiliary brakes 22, 23, a parking brake (not shown), and brake ECU 24.

Service brake 21 is a brake that is generally referred to as a main brake, a friction brake, a foot brake, a foundation brake, or the like. Service brake 21 is a drum brake that obtains braking force by pressing a brake lining against the inner side of a drum that rotates with wheel 17, for example.

Auxiliary brake 22 is a retarder (hereinafter referred to as "retarder 22") that obtains braking force by directly giving load to the rotation of propeller shaft 14, and is an electromagnetic retarder, for example. Auxiliary brake 23 is an exhaust brake (hereinafter referred to as "exhaust brake 23") that increases an effect of an engine brake with use of rotational resistance of the engine. By providing retarder 22 and exhaust brake 23, the braking force can be increased, and the frequency of usage of service brakes 21 is reduced. Therefore, the wear-out of brake lining and the like can be suppressed.

Brake ECU 24 is connected to driving assistance apparatus 30 by an in-vehicle network such as a CAN and is able to transmit and receive necessary data and control signals to and from each other. Brake ECU 24 controls the braking force of service brakes 21 (the brake fluid pressure of wheel cylinders of wheels 17) in accordance with a braking command from driving assistance apparatus 30.

The braking operation of service brakes 21 is controlled by driving assistance apparatus 30 and brake ECU 24. The braking operation of retarder 22 and exhaust brake 23 is controlled by on/off by driving assistance apparatus 30. The braking force of retarder 22 and exhaust brake 23 is substantially fixed. Therefore, when a desired braking force is to be accurately generated, service brakes 21 that can fine-adjust the braking force are suitable.

Information from a millimeter-wave radar and a camera is input to driving assistance apparatus 30. Information from the millimeter-wave radar and the camera is information indicating the traffic situation and the road situation ahead of the vehicle. Driving assistance apparatus 30 has ACC operation section 41, accelerator-operation detection section 43, brake-operation detection section 44, and the like.

Driving assistance apparatus 30 forms control signals for controlling the operation of driving system 10 and braking system 20. Specifically, driving assistance apparatus 30 obtains a target acceleration/deceleration speed for realizing ACC and outputs the target acceleration/deceleration speed to engine ECU 18, motive power transmission ECU 19, and brake ECU 24, as appropriate.

Although not shown, each of engine ECU 18, motive power transmission ECU 19, brake ECU 24, and driving assistance apparatus 30 has a central processing unit (CPU), a storage medium such as a read only memory (ROM) in which a control program is stored, a working memory such as a random access memory (RAM), and a communication circuit, for example. In this case, for example, the functions of sections described below constituting driving assistance apparatus 30 are realized by executing control programs by the CPU. All or some of engine ECU 18, motive power transmission ECU 19, brake ECU 24, and driving assistance apparatus 30 may be integrated.

ACC operation section 41 includes an ACC ON/OFF switch for activating and removing the ACC. ACC operation section 41 includes a setting switch for performing various settings of the ACC. A driver can set a target inter-vehicle distance and a target own-vehicle speed, for example, by operating the setting switch. ACC operation section 41 includes an ACC departure operation section for performing a departure operation during the ACC. The ACC departure operation section is a lever and an accelerator pedal provided in the vicinity of a steering, for example.

Accelerator-operation detection section 43 detects the depression amount of an accelerator pedal and outputs the detection result to driving assistance apparatus 30. Driving assistance apparatus 30 transmits drive commands to engine ECU 18 and motive power transmission ECU 19 on the basis of the depression amount of the accelerator pedal.

Brake-operation detection section 44 detects the depression amount of a brake pedal for operating service brakes 21. Brake-operation detection section 44 detects whether an auxiliary brake lever that causes retarder 22 or exhaust brake 23 to operate has been operated. Brake-operation detection section 44 outputs the detection result relating to the brake pedal and the auxiliary brake lever to driving assistance apparatus 30. Driving assistance apparatus 30 transmits a braking command to brake ECU 24 on the basis of the depression amount of the brake pedal. Driving assistance apparatus 30 controls the ON/OFF operation of retarder 22 or exhaust brake 23 on the basis of the operation of the auxiliary brake lever.

Driving assistance apparatus 30 outputs various information relating to traveling and the ACC from information output section 50. For example, display and sound indicating that the ACC is active or the ACC is removed are output from information output section 50.

<2> Configuration of Driving Assistance Apparatus

Figure 3:
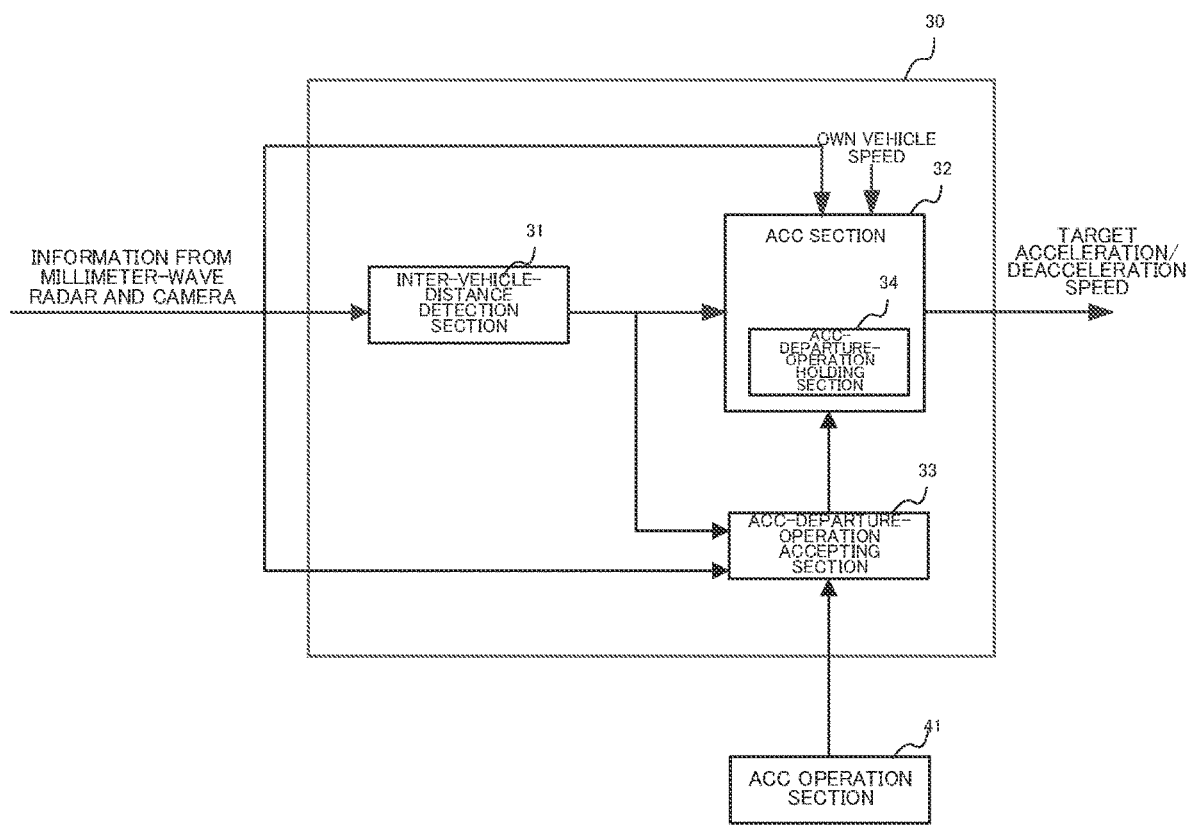
FIG. 3 is a block diagram illustrating the configuration of the driving assistance apparatus of the embodiment.

FIG. 3 is a block diagram illustrating the configuration of driving assistance apparatus 30 of the present embodiment.

Driving assistance apparatus 30 has inter-vehicle-distance detection section 31, ACC section 32, ACC-departure-operation accepting section 33, and ACC-departure-operation holding section 34.

Inter-vehicle-distance detection section 31 measures (detects) the inter-vehicle distance between own vehicle 1 and the leading car on the basis of information on a place ahead of own vehicle 1 obtained by the millimeter-wave radar, the camera, and the like, and outputs the measurement result to ACC section 32. Inter-vehicle-distance detection section 31 may measure the inter-vehicle distance on the basis of information from other sensors such as a laser radar.

ACC section 32 realizes automatic following control by outputting a target acceleration/deceleration speed for causing own car to follow a leading car on the basis of the relative speed and the inter-vehicle distance between the own car and the leading car. When there are no leading cars, ACC section 32 realizes constant speed traveling control by outputting a target acceleration speed for causing the speed of the own car to be a set certain speed.

Automatic-following traveling control is control that operates driving system 10 and braking system 20 such that the inter-vehicle distance is within a predetermined target range and the relative speed approaches zero when a leading vehicle is present in a predetermined range. The constant-speed traveling control is control that operates driving system 10 and braking system 20 such that the traveling speed of vehicle 1 approaches a predetermined target value when there are no leading vehicles in a predetermined range.

ACC-departure-operation accepting section 33 accepts an ACC departure operation by the driver while own vehicle 1 is being stopped. In other words, while own vehicle 1 is being stopped, ACC-departure-operation accepting section 33 detects that the ACC departure operation section included in ACC operation section 41 is operated by the driver (hereinafter referred to as the "ACC departure operation") and outputs the ACC departure operation to ACC section 32.

When the ACC departure operation is input to ACC section 32, ACC section 32 performs departure during the ACC when a predetermined condition is satisfied. ACC section 32 holds the ACC departure operation in ACC-departure-operation holding section 34 for a predetermined period of time.

ACC-departure-operation holding section 34 holds the ACC departure operation as an effective instruction for a predetermined period of time from when the ACC departure operation is provided and cancels the ACC departure operation after an elapse of the predetermined period of time.

<3> Operation of Driving Assistance Apparatus

Figure 4:
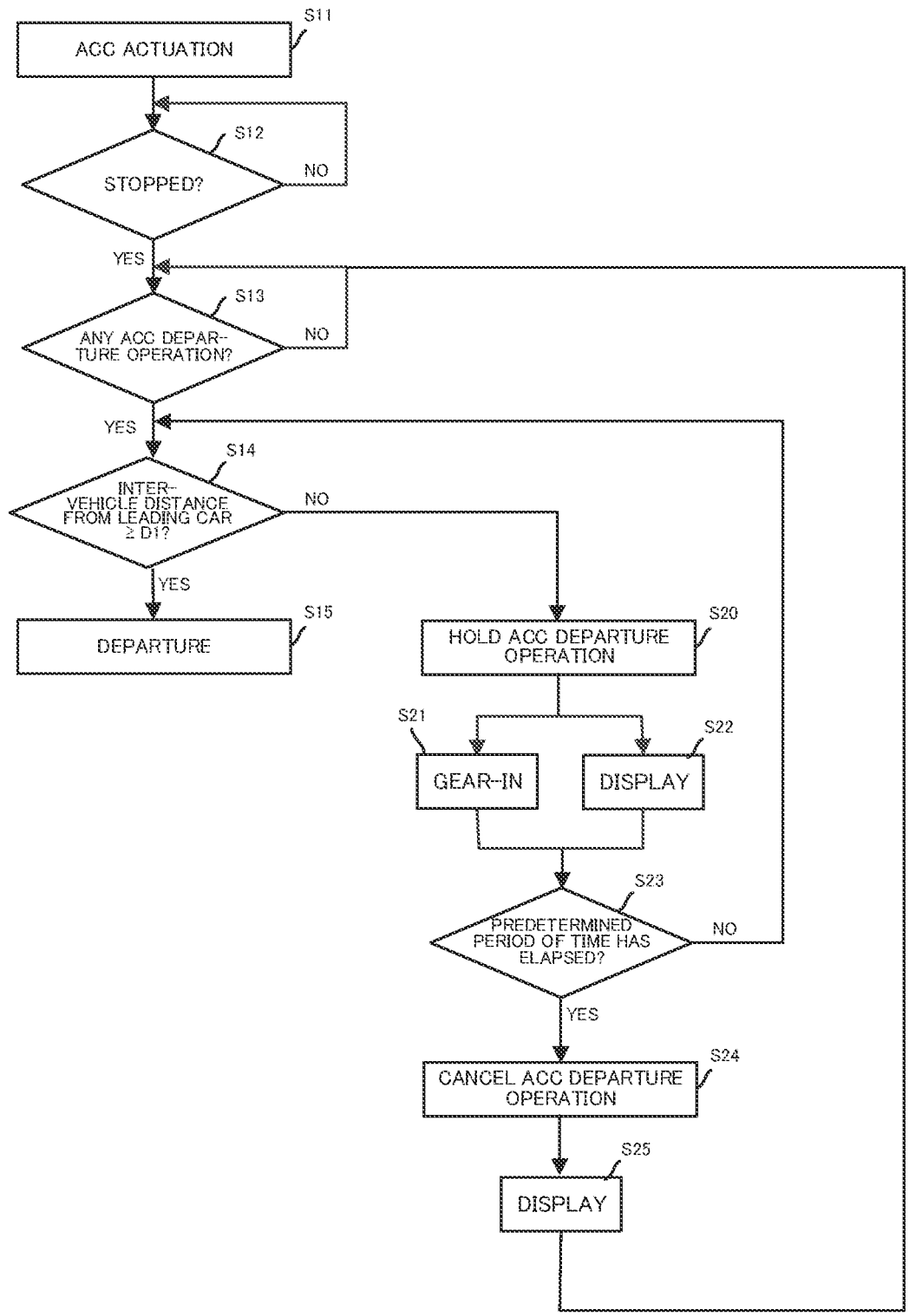
FIG. 4 is a flowchart provided for the description of the operation of the driving assistance apparatus of the embodiment.

Next, an operation of driving assistance apparatus 30 is described. Driving assistance apparatus 30 of the present embodiment is particularly characterized by the operation from the stoppage to departure of vehicle. Therefore, the operation from the stoppage to departure of vehicle is mainly described here with reference to FIG. 4.

When vehicle 1 stops from an ACC-active state (Step S11) (Step S12; YES), transition is made to Step S13, and the ACC departure operation is waited for. When there is a departure operation, driving assistance apparatus 30 transitions from Step S13 to Step S14.

In Step S14, ACC section 32 determines whether the inter-vehicle distance from the leading car is equal to or more than departure-permission inter-vehicle distance D1, and transitions to Step S15 and causes vehicle 1 to depart when the inter-vehicle distance from the leading car is equal to or more than departure-permission inter-vehicle distance D1 (Step S14; YES). While the ACC is active, departure-permission inter-vehicle distance D1 is generally greater than stopped-vehicle inter-vehicle distance D2. Therefore, when the driver performs the ACC departure operation at a vehicle stopped position in accordance with the ACC, a negative result is obtained in Step S14. Meanwhile, when the driver performs the ACC departure operation when the distance from the leading car becomes equal to or more than departure-permission inter-vehicle distance D1, an affirmative result is obtained in Step S14.

When a negative result is obtained in Step S14, driving assistance apparatus 30 transitions to Step S20 and holds the ACC departure operation in ACC-departure-operation holding section 34.

Next, in Step S21, driving assistance apparatus 30 outputs a control signal instructing motive power transmission ECU 19 to connect a gear of transmission 13 (gear-in). At this time, driving assistance apparatus 30 outputs a control signal instructing motive power transmission ECU 19 to place the clutch in a disconnected state.

In this way, when the distance from the leading car satisfies the condition in Step S14 and vehicle 1 starts the departure, the departure can be performed with excellent responsiveness. In other words, holding an ACC departure operation signal means that the departure is imminent, and hence departure preparation is performed by effectively using the period of time in which the ACC departure operation is held in the present embodiment.

In Step S22, driving assistance apparatus 30 outputs a control signal for causing information output section 50 to perform display indicating that the ACC departure operation is held. The driver may be notified that the ACC departure operation is held by voice. In short, an output indicating that the ACC departure operation is held in a manner that is recognizable by the driver only needs to be output in a period of time in which ACC-departure-operation holding section 34 holds the ACC departure operation.

In this way, the driver can recognize that the ACC departure operation is held, and hence does not need to perform needless ACC departure operation.

Next, in Step S23, it is determined whether a predetermined period of time has elapsed from when there has been the ACC departure operation. When the predetermined period of time has not elapsed (Step S23; NO), the processing returns to Step S14, and ACC section 32 determines whether the inter-vehicle distance from the leading car has become equal to or more than departure-permission inter-vehicle distance D1 again.

Meanwhile, when the predetermined period of time elapses (Step S23; YES), the processing transitions to Step S23, and the ACC departure operation held in ACC-departure-operation holding section 34 is canceled (deleted). The abovementioned predetermined period of time is preferably 10 seconds or less. The abovementioned predetermined period of time is to be a period of time by which the driver does not forget that the driver has performed the ACC departure operation.

In the present embodiment, the ACC departure operation held in ACC-departure-operation holding section 34 is canceled after an elapse of the abovementioned predetermined period of time due to the following reason. In other words, it is extremely dangerous when the driver forgets that the ACC departure operation is held and the vehicle performs departure at a timing that is unintended by the driver, and the above is performed in order to avoid this situation.

In Step S25, driving assistance apparatus 30 outputs a control signal for causing information output section 50 to perform display indicating that the ACC departure operation has been canceled. The driver may be notified that the ACC departure operation has been canceled by voice. In short, an output indicating that the ACC departure operation has been canceled only needs to be output in a manner that is recognizable by the driver.

Driving assistance apparatus 30 returns to Step S13 after Step S25.

The main points of the operation of driving assistance apparatus 30 of the present embodiment are the following points.

For example, the driver performs the ACC departure operation when the leading car starts moving from a state of being stopped at a red traffic light. At this time, when a configuration in which the ACC departure operation is not accepted when the distance from the leading car is not equal to or more than departure-permission inter-vehicle distance D1 is employed, the driver is forced to perform a burdensome ACC departure operation.

In view of the above, in the present embodiment, the ACC departure operation by the driver is accepted even when the inter-vehicle distance from the leading car is smaller than departure-permission inter-vehicle distance D1. The ACC departure operation is held for a predetermined period of time (for example, two seconds), and the ACC departure operation is canceled when the predetermined period of time elapses.

In other words, the departure by the ACC is performed when the inter-vehicle distance from the leading car becomes equal to or more than departure-permission inter-vehicle distance D1 within a predetermined period of time from when the ACC departure operation is performed. Meanwhile, when the inter-vehicle distance from the leading car does not become equal to or more than departure-permission inter-vehicle distance D1 within a predetermined period of time, the ACC departure operation is canceled, and the driver performs the ACC departure operation again.

As above, by canceling the ACC departure operation when the inter-vehicle distance from the leading car does not become equal to or more than departure-permission inter-vehicle distance D within a predetermined period of time, the departure can be prevented from being performed when the driver forgets that the driver has performed the ACC departure operation.

<4> Effects of Embodiment

As described above, according to the present embodiment, driving assistance apparatus 30 includes: ACC-departure-operation accepting section 33 that accepts the ACC departure operation by the driver while the own car is being stopped; and ACC-departure-operation holding section 34 that holds the ACC departure operation accepted by ACC-departure-operation accepting section 33 as an effective instruction for a predetermined period of time from when the ACC departure operation is provided and cancels the ACC departure operation after an elapse of the predetermined period of time. As a result, the ACC departure operation by the driver at the time of departure can be simplified while avoiding a case where the ACC departure is performed at a timing unintended by the driver.

<5> Other Embodiments

The abovementioned embodiment is merely an example of a realization for carrying out the present invention, and the interpretation of the technical scope of the present invention is not to be limited by those embodiments. In other words, the present invention can be carried out in various forms without departing from the gist or the main features of the present invention.

In the abovementioned embodiment, ACC-departure-operation holding section 34 is provided in ACC section 32, but ACC-departure-operation holding section 34 may be provided on the outside of ACC section 32. ACC-departure-operation accepting section 33 may be on the inside of ACC section 32.

In the abovementioned embodiment, a case where vehicle 1 to which the driving assistance apparatus and method of the present invention are applied is a tractor capable of towing trailer 2 by coupling trailer 2 to the tractor is described. However, the vehicle to which the present invention is applicable is not limited thereto and may be a vehicle such as a passenger car.

The present application is based on Japanese Patent Application (Japanese Patent Application No. 2020-34393) filed on Feb. 28, 2020, the entire content of which is incorporated herein by reference.

INDUSTRIAL APPLICABILITY

The driving assistance apparatus and the driving assistance method of the present disclosure are suitable for use as a driving assistance apparatus and a driving assistance method capable of simplifying an ACC departure operation by a driver at the time of departure while avoiding a case where the ACC departure is performed at a timing unintended by the driver.

REFERENCE SIGNS LIST

1 Vehicle
2 Trailer
3 Vehicle main-body portion
10 Driving system
11 Engine
12 Clutch
13 Transmission
14 Propeller shaft
15 Differential gear
16 Drive shaft
17 Wheel
18 Engine ECU
19 Motive power transmission ECU
20 Braking system
21 Service brake
22 Retarder
23 Exhaust brake
24 Brake ECU
30 Driving assistance apparatus 31 Inter-vehicle-distance detection section
32 ACC section
33 ACC-departure-operation accepting section
34 ACC-departure-operation holding section
41 ACC operation section
43 Accelerator-operation detection section
44 Brake-operation detection section
50 Information output section

The invention claimed is:

1. A driving assistance apparatus that assists driving of a vehicle, the driving assistance apparatus comprising:
   an ACC-departure-operation accepting section that accepts a departure operation by a driver when adaptive cruise control (ACC) is ON and while the vehicle is being stopped; and
   an ACC-departure-operation holding section that holds the ACC departure operation accepted by the ACC-departure-operation accepting section as an effective instruction for a predetermined period of time from when the ACC departure operation is provided and cancels the ACC departure operation after an elapse of the predetermined period of time, wherein
   an inter-vehicle distance from a leading vehicle when the vehicle is stopped by the ACC is set to be smaller than a departure-permission inter-vehicle distance, and
   departure of the vehicle by the ACC is performed when an inter-vehicle distance from the leading vehicle becomes equal to or more than the departure-permission inter-vehicle distance within the predetermined period of time.

2. The driving assistance apparatus according to claim 1, wherein a gear is placed in an in-state and a clutch is placed in a disconnected state in a period of time in which the ACC-departure-operation holding section holds the ACC departure operation.

3. The driving assistance apparatus according to claim 1, wherein an output indicating that the ACC departure operation is held is output in a manner that is recognizable by the driver in the period of time in which the ACC-departure-operation holding section holds the ACC departure operation.

4. The driving assistance apparatus according to claim 1, wherein:
   an output indicating that the ACC departure operation is held is output in a manner that is recognizable by the driver in a period of time in which the ACC-departure-operation holding section holds the ACC departure operation; and
   an output indicating that the ACC departure operation is canceled is output in a manner that is recognizable by the driver when the ACC-departure-operation holding section cancels the ACC departure operation.

5. The driving assistance apparatus according to claim 1, wherein the predetermined period of time is 10 seconds or less.

6. A driving assistance method of assisting driving of a vehicle, the driving assistance method comprising:
   accepting a departure operation by a driver when adaptive cruise control (ACC) is ON and while the vehicle is being stopped;
   holding the accepted ACC departure operation as an effective instruction for a predetermined period of time from when the ACC departure operation is provided and canceling the ACC departure operation after an elapse of the predetermined period of time; and
   performing departure of the vehicle by the ACC when an inter-vehicle distance from a leading vehicle becomes equal to or more than a departure-permission inter-vehicle distance within the predetermined period of time, wherein an inter-vehicle distance from the leading vehicle when the vehicle is stopped by the ACC is set to be smaller than the departure-permission inter-vehicle distance.

* * * * *